United States Patent
Yamashita (10) Patent No.: US 7,430,373 B2
(45) Date of Patent: Sep. 30, 2008

(54) OPTICAL NODE PROCESSOR, OPTICAL NETWORK SYSTEM AND ITS CONTROL METHOD

(75) Inventor: Makoto Yamashita, Tokyo (JP)

(73) Assignee: NEC Corporation, Tokyo (JP)

( * ) Notice: Subject to any disclaimer, the term of this patent is extended or adjusted under 35 U.S.C. 154(b) by 626 days.

(21) Appl. No.: 10/793,227

(22) Filed: Mar. 5, 2004

(65) Prior Publication Data

US 2004/0179845 A1    Sep. 16, 2004

(30) Foreign Application Priority Data

Mar. 10, 2003    (JP)    ............... 2003-063231

(51) Int. Cl.
*H04B 10/24* (2006.01)
(52) U.S. Cl. ............... 398/83; 398/15; 398/37; 398/38; 398/167
(58) Field of Classification Search ............. 398/83–88, 398/15, 37–38, 167
See application file for complete search history.

(56) References Cited

U.S. PATENT DOCUMENTS

| | | | | |
|---|---|---|---|---|
| 5,005,937 A | * | 4/1991 | Aida et al. ............. | 385/24 |
| 5,812,710 A | * | 9/1998 | Sugaya .................... | 385/27 |
| 6,392,769 B1 | * | 5/2002 | Ford et al. .............. | 398/9 |
| 7,006,771 B1 | * | 2/2006 | Miyata et al. .......... | 398/198 |
| 2003/0053175 A1 | * | 3/2003 | Szczepanek et al. ... | 359/163 |

FOREIGN PATENT DOCUMENTS

JP    2000-354006    12/2000

\* cited by examiner

*Primary Examiner*—Leslie Pascal
(74) *Attorney, Agent, or Firm*—McGinn IP Law Group, PLLC (57) ABSTRACT

An optimum optical node processor is provided to a metropolitan network in which the distance of a transmission line between each optical node processor is short. The optical node processor according to the invention is provided with an optical add/drop multiplexer (OADM), variable optical control means connected to the OADM for collectively attenuating the intensity level of WDM optical signals, a controller for controlling the variable optical control means and monitoring control means for controlling the controller according to information from an external device, and enables the automatic power reduction (APR) control and the output control of an optical network system.

17 Claims, 5 Drawing Sheets

OPTICAL NODE PROCESSOR, OPTICAL NETWORK SYSTEM AND ITS CONTROL METHOD

BACKGROUND OF THE INVENTION

1. Field of the Invention

The present invention relates to an optical node processor provided to an optical network system using wavelength division multiplexing (WDM) technology, particularly relates to an optical node processor, an optical network system and its control method provided with an optical add/drop multiplexer (OADM) for adding/dropping an optical signal of an arbitrary wavelength to/from a WDM optical signal.

2. Description of Related Art

A demand for data communication rapidly increases by the population of the Internet. As a result, data communication requires mass storage. Then, to efficiently increase communication traffic, WDM technology is extensively used. Recently, the configuration of a ring and a mesh has been adopted as the configuration of a network to make the configuration of the network correspond to the modern advanced society. Then, in an optical node processor to be each node of the ring and the mesh, technique for adding/dropping the information of an optical signal is required. In an optical network system using WDM technology, for technique for adding/dropping an optical signal of a specific wavelength in a state of the optical signal, there is OADM technique.

Figure 1:
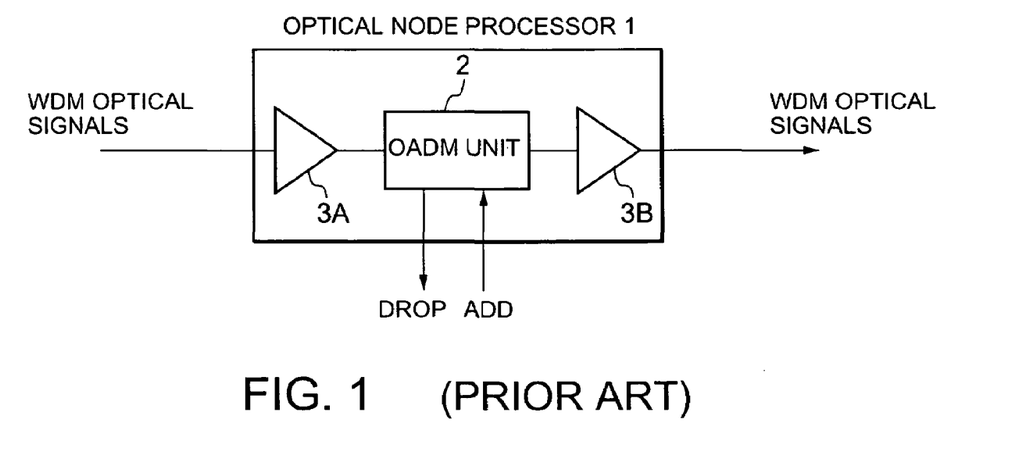
FIG. 1 is a block diagram showing a conventional type optical node processor.

FIG. 1 shows the configuration of an optical node processor using conventional type OADM technique disclosed in Japanese published unexamined patent application No. 2000-354006.

The optical node processor 1 is provided with an optical add/drop multiplexer (OADM) unit 2 and two optical amplifiers 3A and 3B arranged before and after the optical add/drop multiplexer.

A predetermined wavelength of a WDM optical signal input to the optical node processor 1 is added/dropped by OADM unit 2 after the WDM optical signals are collectively amplified by the optical amplifier 3A in an input part of the optical node processor 1. The WDM optical signal output from OADM unit 2 is collectively amplified by the optical amplifier 3B in an output part of the optical node processor 1 again and is sent to a transmission line. In a large-scale network of a long-distance transmission system, the optical node processor having such configuration has been used so far.

Recently, not only in a long-distance transmission system but in such a metropolitan small-scale network as in a city, a demand for an optical network system using WDM technology increases because of the increase of communication traffic. The metropolitan network is characterized differently from a general backbone network of a long-distance transmission system in that the distance of a transmission line between each optical node processor is short. Then, as for the metropolitan small-scale network, a lower-priced and more efficient network than conventional type networks is needed to be immediately configured. Accordingly, as for an optical node processor, a low-priced and efficient processor fitted to the metropolitan network is also demanded.

Figure 2:
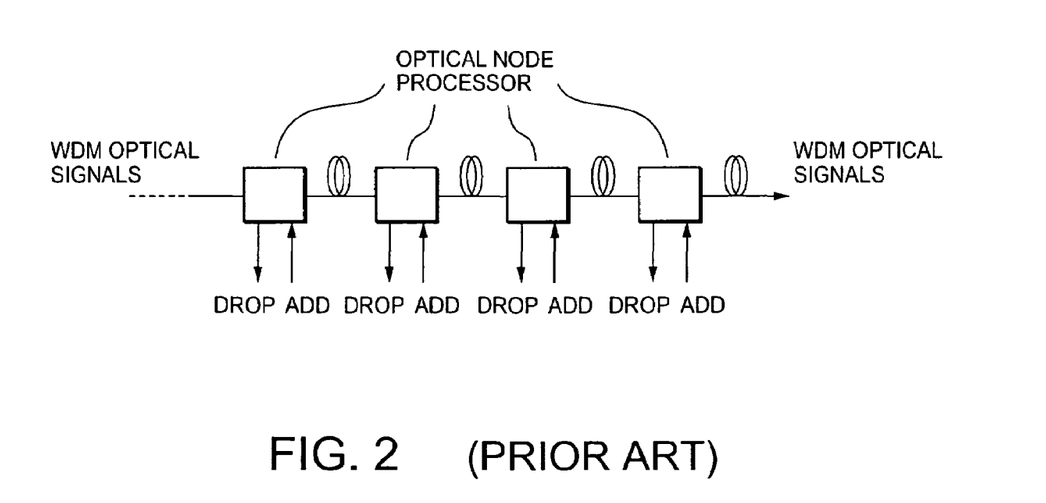
FIG. 2 is a block diagram showing one example of an optical network system using the optical node processor.

FIG. 2 shows an example of network configuration provided with an optical node processor in the case of tandem connection. In each optical node processor, an optical signal of a predetermined wavelength is added/dropped. However, in a metropolitan small-scale network, the distance of a transmission line between optical node processors is short and the loss of the transmission line may be small. In such a case, in configuration without an optical amplifier in an output part of an optical node processor, a WDM optical signal can be also normally transmitted, however, a new problem that automatic power reduction (APR) control in which safety is considered is disabled occurs. APR control means control that optical output from an optical node processor on the upstream side is shut down because of transmission line failure on the downstream side by the disconnection of the transmission line and others. Owing to this control, a transmission line and processor on the downstream side can be prevented from being damaged by a high output optical signal from a disconnected location. As described above, APR control is important control to guarantee a network.

SUMMARY OF THE INVENTION

The object of the invention is to provide an optical node processor, an optical network system and its control method respectively optimum for a metropolitan network short in the distance of a transmission line between each optical node processor.

The optical node processor according to the invention is provided with an add/drop multiplexer for adding/dropping an arbitrary wavelength out of WDM optical signals, variable optical attenuation means for collectively attenuating intensity levels of WDM optical signals output from the add/drop multiplexer, a controller for controlling the variable optical attenuation means and monitoring control means for controlling the controller according to information from an external device.

The optical network system according to the invention is provided with plural optical node processors using a WDM optical signal and is provided with opposite optical transmission lines, a downstream optical node processor having optical detection means for detecting transmission line failure on one downstream side of the opposite optical transmission lines, transfer means for returning information from the optical detection means to the upstream side and an upstream optical node processor having variable optical attenuation means for collectively attenuating intensity levels of output WDM optical signals according to information from the transfer means.

Hereby, in the optical node processor and the optical network system according to the invention, APR control for securing the safety of the optical network system is enabled in addition to effect that the number of high-priced optical amplifiers is reduced.

Concretely, in case disconnection and others are caused on the downstream side of a transmission line, its information is fed back to the monitoring control means on the upstream side, the controller is operated, the variable optical attenuation means is controlled and signal light output to the downstream side is shut down. Therefore, high-power signal light is prevented from being output to the downstream side and can be prevented from leaking from a disconnected location. As described above, in the optical node processor and the optical network system according to the invention, no optical amplifier in either of an output part or an input part of the optical node processor or in both parts is required. Therefore, in the optical node processor according to the invention, the number of high-priced optical amplifiers can be reduced and APR control is enabled.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENTS:

The basic configuration and the operational principle of an optical node processor and an optical network system according to the invention will be described below.

Figure 3:
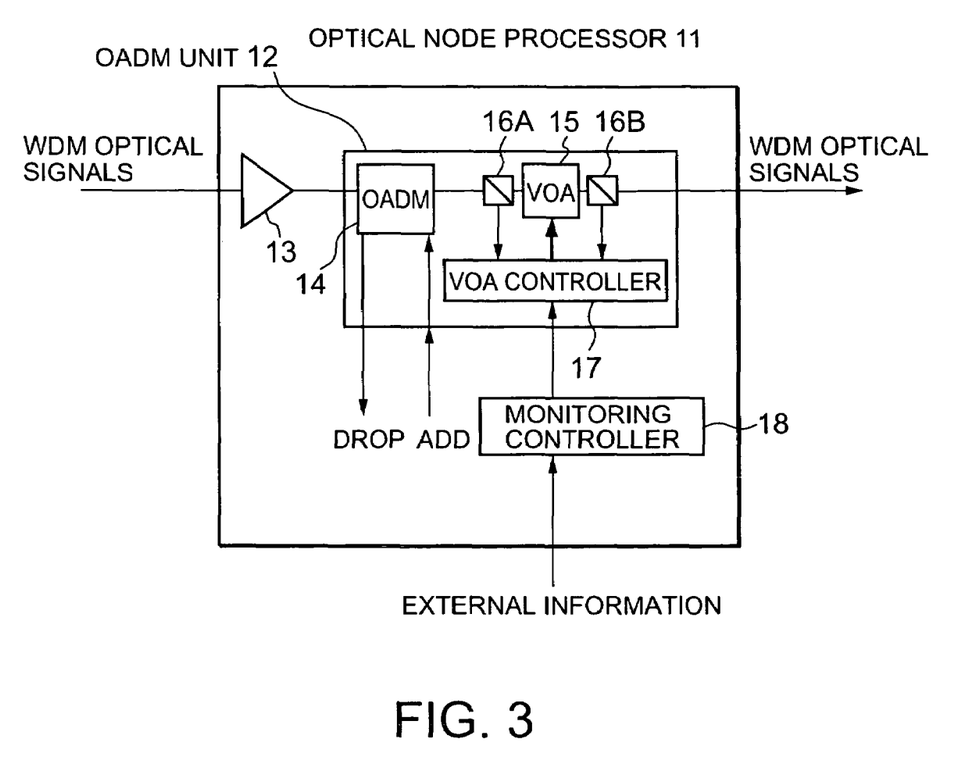
FIG. 3 is a block diagram showing an optical node processor equivalent to a first embodiment of the invention.

FIG. 3 shows an optical node processor equivalent to a first embodiment of the invention.

The optical node processor 11 equivalent to the first embodiment of the invention is provided with an optical amplifier 13, OADM 14, a variable optical attenuator (VOA) 15, optical couplers 16A and 16B installed before and after the VOA 15, a VOA controller 17 for controlling VOA 15 and a monitoring controller 18. Out of these, OADM 14, the VOA 15, the optical couplers 16A and 16B and the VOA controller 17 may be also collectively packaged as an OADM unit 12. The monitoring controller 18 can control the VOA controller 17 according to information from an external device.

The optical node processor 11 according to the invention and the conventional type optical node processor 1 are greatly different in that the optical amplifier 3B is not required and the number of high-priced optical amplifiers can be reduced.

Next, referring to FIG. 3, the operation of the optical node processor 11 equivalent to the first embodiment of the invention will be described.

A WDM optical signal transmitted from the left in FIG. 3 is input to the optical node processor 11 and is collectively amplified by the optical amplifier 13. After the amplified WDM optical signals are demultiplexed into individual wavelengths by OADM 14 provided to the OADM unit 12 and predetermined wavelengths are added/dropped, the predetermined wavelengths are multiplexed again. Next, the WDM optical signal is output to the side of VOA 15 installed on the output side of the OADM unit 12. The optical couplers 16A, 16B are installed before and after VOA 15 and optical intensity levels before and after VOA 15 can be monitored. After the optical intensity level of the WDM signal light is adjusted by VOA 15 and the optical couplers 16A, 16B, the signal light is output to the transmission line again. In this case, VOA 15 can be controlled by the VOA controller 17. The VOA controller 17 can control VOA 15 so that a loss amount between the optical couplers 16A and 16B is fixed (loss fixing control) or can control VOA 15 so that a level of branched light detected by the optical coupler 16B is fixed (level fixing control). Further, the VOA controller 17 can be controlled by the monitoring controller 18 according to information from an external device.

Figure 4A:
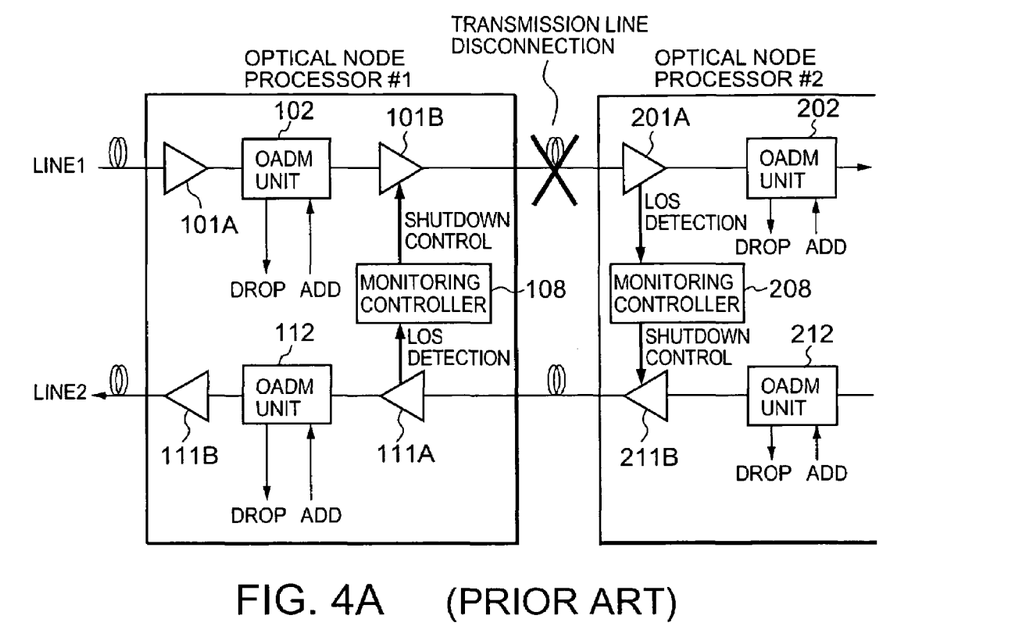
FIG. 4A is an explanatory drawing for explaining an APR control method executed in the optical network system using the conventional type optical node processor and FIG. 4B is an explanatory drawing for explaining an APR control method executed in the optical network system using the optical node processor equivalent to the first embodiment of the invention.
Figure 4B:
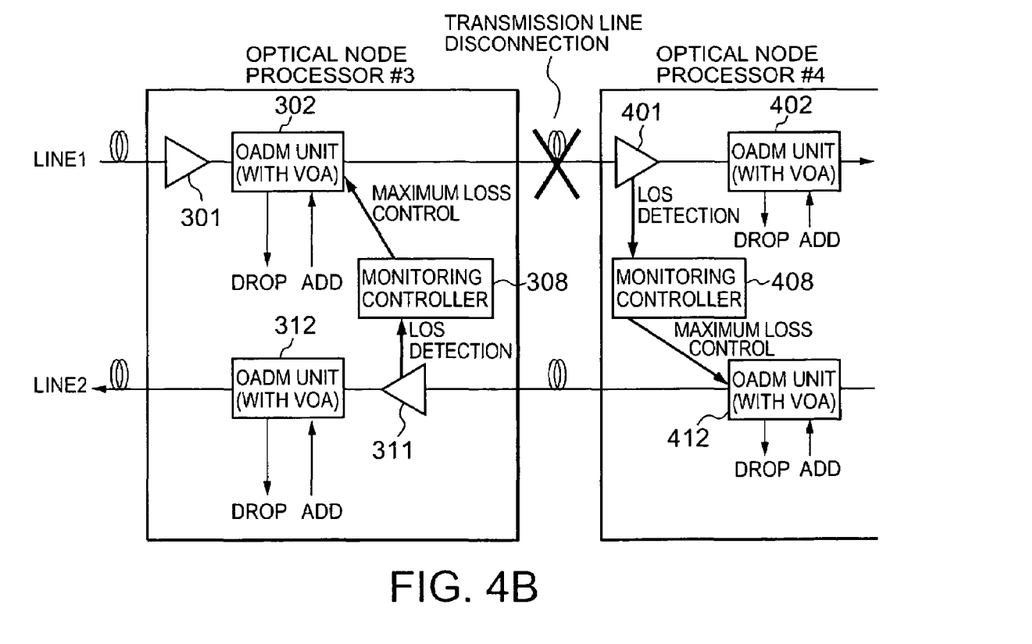

Next, an APR control method executed in the optical network system provided with the optical node processor equivalent to the first embodiment of the invention will be described, compared with a conventional type APR control method. FIG. 4A shows the APR control method executed in the optical network system provided with the conventional type optical node processor and FIG. 4B shows the APR control method executed in the optical network system provided with the optical node processor equivalent to the first embodiment of the invention.

First, referring to FIG. 4A, the APR control method executed in the optical network system provided with the conventional type optical node processor will be described. A normal WDM optical signal is transmitted via two opposite optical fibers of Line No. 1 and Line No. 2. As the stream of the WDM optical signal in the optical node processor on each line is the same as that in FIG. 1, the description is omitted. In FIG. 4A, a case that disconnection is caused on Line No. 1 between the optical node processors #1 and #2 is shown. In this case, there is possibility that a high-power optical signal is output from the disconnected optical fiber and from the viewpoint of safety, optical signals output from the optical node processor #1 are required to be shut down. In other words, the output of an optical amplifier 101B in the optical node processor #1 is required to be shut down. Naturally, the optical amplifier 101B of the optical node processor #1 is provided with a function for detecting reflected light by Fresnel reflection caused by disconnection from a connector or the disconnection of the optical fiber in a close location and shutting down output. However, in case the disconnected location is far from the optical node processor #1, reflected light caused there is attenuated and may be unable to be detected in the optical node processor #1. As a result, the output of the optical amplifier 101B may be unable to be shut down.

Then, the operation of the APR control executed in the optical network system provided with the conventional type optical node processor will be described below. First, as an input signal to an optical amplifier 201A of the optical node processor #2 is disconnected at the same time as failure occurs (the transmission line is disconnected), the optical amplifier 201A detects an input disconnection (Loss of Signal: LOS) alarm. A monitoring controller 208 of the optical node processor #2 controls using the LOS alarm as a trigger so that an optical amplifier 211B on the side of Line No. 2 is shut down. Thereby, as an input signal to an optical amplifier 111A of the optical node processor #1 is disconnected, the optical amplifier 111A detects an input disconnection (LOS) alarm. The monitoring controller 108 of the optical node processor.#1 controls using the LOS alarm as a trigger so that the optical amplifier 101B on the side of Line No. 1 is shut down. The output of the optical node processor on the upstream side of the transmission line on which failure occurs can be shut down by a series of operation described above.

In the meantime, referring to FIG. 4B, the APR control method executed in the optical network system provided with the optical node processor equivalent to the first embodiment of the invention will be described below. In FIG. 4B, a case that transmission is performed via two opposite optical fibers of Line No. 1 and Line No. 2 is also shown. As the stream of a WDM optical signal in the optical node processor on each line is the same as that shown in FIG. 3, the description is omitted. In FIG. 4B, a case that disconnection is caused between optical node processors #3 and #4 on Line No. 1 is shown. There is possibility that a high-power optical signal is output from a disconnected optical fiber and from the viewpoint of safety, an optical signal output from the optical node processor #3 is required to be shut down. In other words, the output of an OADM unit 302 in the optical node processor #3 is required to be shut down.

Therefore, the operation of APR control executed in the optical network system provided with the optical node processor according to the invention will be described below. First, as an input signal to an optical amplifier 401 of the optical node processor #4 is disconnected as the same time as failure occurs (the transmission line is disconnected), the optical amplifier 401 detects an input disconnection (LOS) alarm. A monitoring controller 408 of the optical node processor #4 maximizes the loss of VOA provided to an OADM unit 412 on the side of Line No. 2 using the LOS alarm as a trigger. If VOA the maximum loss of which is approximately 30 dB is applied, the similar effect to the effect of shutdown by the optical amplifier is acquired. Hereby, as an input signal to an optical amplifier 311 of the optical node processor #3 is disconnected, the optical amplifier 311 detects an input disconnection (LOS) alarm. A monitoring controller 308 of the optical node processor #3 maximizes the loss of VOA provided to the OADM unit 302 on the side of Line No. 1 using the LOS alarm as a trigger. The output of the optical node processor on the upstream side of the transmission on which failure occurs can be shut down by a series of operation described above.

As described above, in the optical network system provided with the optical node processor equivalent to the first embodiment of the invention, the low-priced and efficient APR control is realized without using a high-priced optical amplifier as in the conventional type.

Next, an output control method executed in the optical network system provided with the optical node processor equivalent to the first embodiment of the invention will be described.

First, referring to FIG. 4A, an output control method executed in the optical network system provided with the conventional type optical node processor will be described. In the conventional type optical node processor #1, the optical amplifier 101B is controlled so that an output level or gain is fixed. However, actually, as the distance of a transmission line between optical node processors is different, the level of an input optical signal is different. To fix the level, an optical fixed attenuator is required to be inserted into an input part of the optical amplifier 201A of the optical node processor #2. Therefore, troublesome labor of preparing optical fixed attenuators different in attenuation beforehand and inserting any in accordance with each transmission line is required.

Figure 5:
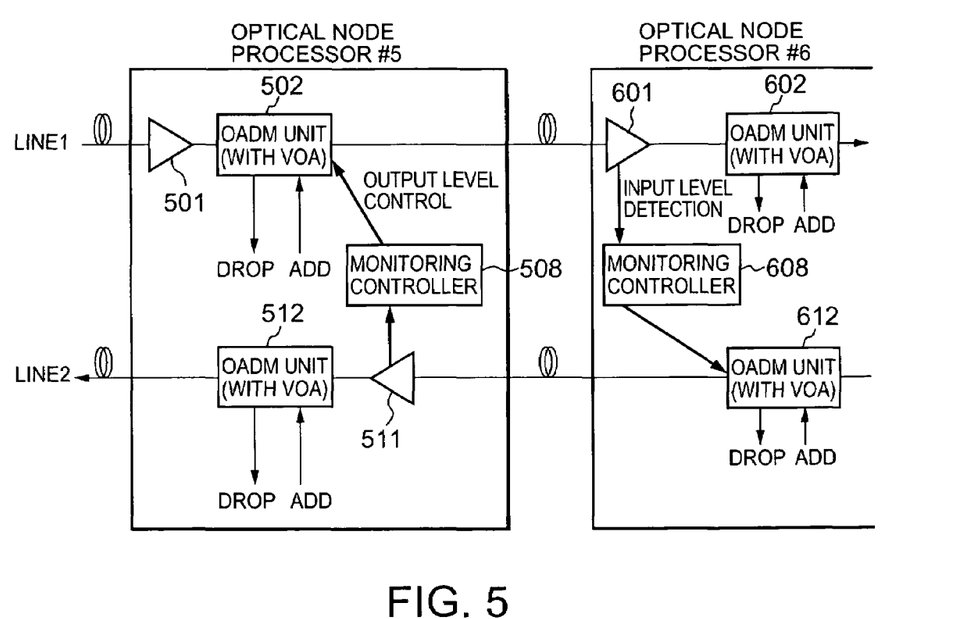
FIG. 5 is an explanatory drawing for explaining an output control method executed in the optical network system using the optical node processor equivalent to the first embodiment of the invention.

In the meantime, referring to FIG. 5, an output control method executed in the optical network system provided with the optical node processor equivalent to the first embodiment of the invention will be described below. In the optical network system according to the invention, an optical amplifier 601 of an optical node processor #6 detects an input level. The detection information is sent to an OADM unit 612 of opposite Line No. 2 via a monitoring controller 608. The detection information is superimposed as a detection signal of a separate wavelength from a main signal of Line No. 2 in the OADM unit 612. After the detection signal is transmitted on the transmission line, it is sent to an optical amplifier 511 of an optical node processor #5. After the detection signal is demultiplexed by a WDM filter (not shown) and others mounted in the optical amplifier 511, photoelectric conversion is applied to the detection signal, the detection signal is detected and is fed back to an OADM unit 502 via a monitoring controller 508 as detection information. Hereby, the attenuation is adjusted by VOA mounted in the OADM unit 502 and the input level of the optical amplifier 601 of the optical node processor #6 can be adjusted to a desired value.

Hereby, the input level of the optical amplifier 601 of the optical node processor #6 can be controlled so that the input level is a desired level. Therefore, in the optical network system using the optical node processor equivalent to the first embodiment of the invention, the troublesome labor of preparing optical fixed attenuators different in attenuation beforehand and inserting it in accordance with each transmission line as in the prior art is not required and an input level in each optical node processor can be easily optimized.

The above-mentioned output control method is one example, an operating terminal (not shown) is installed in each node processor, the operating terminals are connected via LAN and others, detection information is communicated via LAN, VOA is controlled and an input level in each node processor can be also adjusted.

Figure 6:
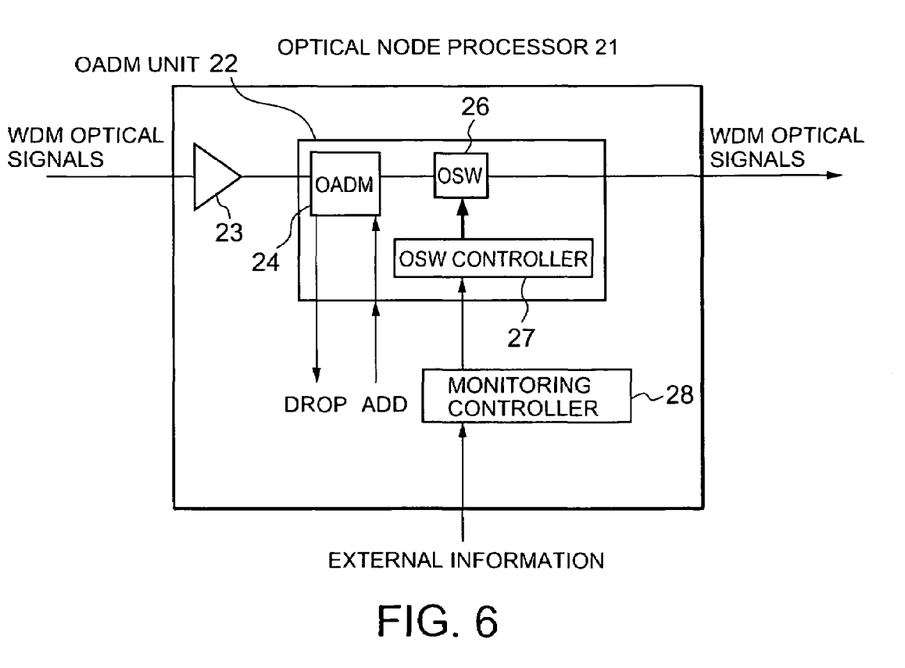
FIG. 6 is a block diagram showing an optical node processor equivalent to a second embodiment of the invention.

FIG. 6 shows an optical node processor equivalent to a second embodiment of the invention.

The optical node processor equivalent to the second embodiment of the invention is provided with an optical amplifier 23, OADM 24, an optical switch (OSW) 26, an OSW controller 27 and a monitoring controller 28. Out of these, OADM 24, the optical switch (OSW) 26 and the OSW controller 27 may be also collectively packaged as an OADM unit 22. The monitoring controller 28 can control the OSW controller 27 according to information from an external device.

Next, referring to FIG. 6, the operation of the optical node processor 21 equivalent to the second embodiment of the invention will be described.

A WDM optical signal transmitted from the left in FIG. 6 is input to the optical node processor 21 and is collectively amplified by the optical amplifier 23. After the amplified WDM optical signals are demultiplexed into individual wavelengths by OADM 24 of the OADM unit 22 and predetermined wavelengths are added/dropped, the predetermined wavelengths are multiplexed again. Next, the WDM optical signal is output to the side of OSW 26 installed on the output side of the OADM unit 22. OSW 26 is controlled so that the output of light is stopped according to control information from the OSW controller 27. Further, the OSW controller 27 can be controlled by the monitoring controller 28 according to information from an external device.

Figure 7:
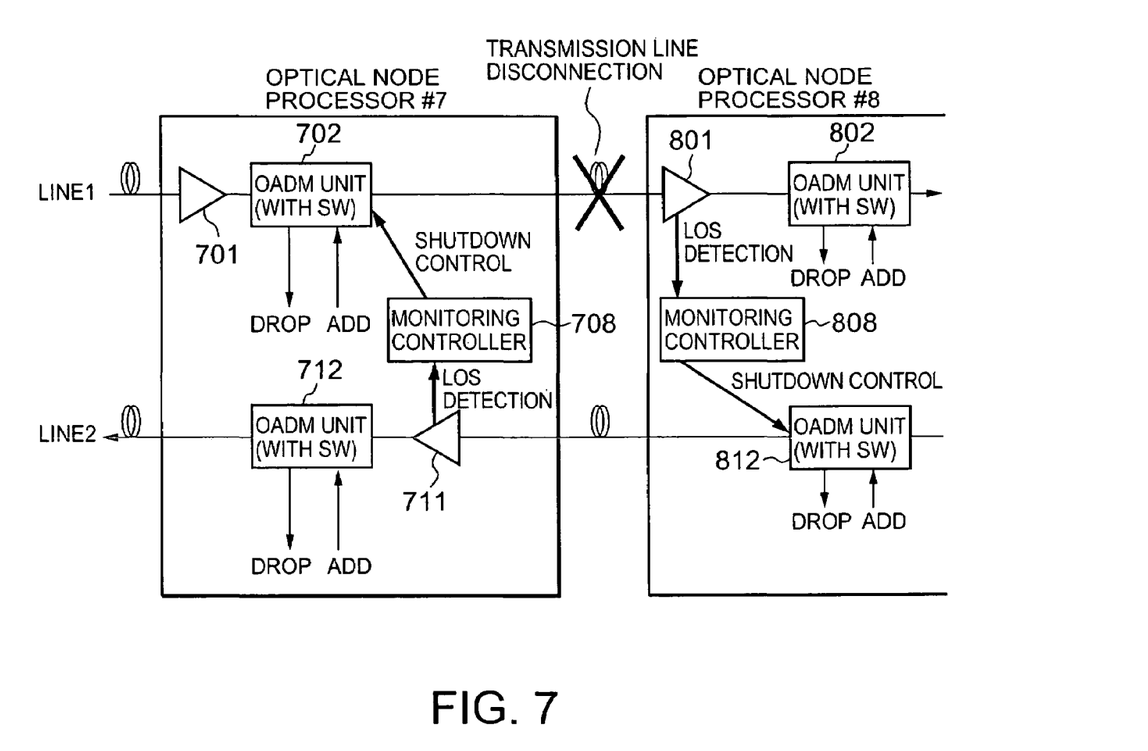
FIG. 7 is an explanatory drawing for explaining an APR control method executed in the optical network system using the optical node processor equivalent to the second embodiment of the invention.

FIG. 7 shows APR control executed in the optical network system provided with the optical node processor equivalent to the second embodiment of the invention. In the second embodiment, the similar control to the control shown in FIG. 4B in the first embodiment is made. In the first embodiment, the output of light from the OADM unit is stopped by VOA, however, the second embodiment is different in that the output of light from the OADM unit is stopped by OSW.

As the stream of a WDM optical signal in the optical node processor on each line is the same as that shown in FIG. 6, the description is omitted. FIG. 7 shows a case that disconnection is caused on a transmission line between optical node processors #7 and #8 on Line No. 1. First, as an input signal to an optical amplifier 801 of the optical node processor #8 is disconnected at the same time as failure occurs (the transmission line is disconnected), the optical amplifier 801 detects an input disconnection (LOS) alarm. A monitoring controller 808 of the optical node processor #8 instructs OSW provided to an OADM unit 812 on the side of Line No. 2 to shut down optical output using the LOS alarm as a trigger. Hereby, as an input signal to an optical amplifier 711 of the optical node processor #7 is disconnected, the optical amplifier 711 detects an input disconnection (LOS) alarm. A monitoring controller 708 of the optical node processor #7 instructs OSW provided to an OADM unit 702 on the side of Line No. 1 to shut down optical output using the LOS alarm as a trigger. The output of the optical node processor on the upstream side of the transmission line on which failure occurs can be shut down by a series of operations described above.

As described above, in the optical network system provided with the optical node processor equivalent to the second embodiment of the invention, the low-priced and efficient APR control is realized without using the conventional type high-priced optical amplifier.

In the above-mentioned embodiments, the case that an optical amplifier in the output part of the optical node processor is omitted is described, however, in case a transmission line is very short and in case optical node processors are closely arranged, both optical amplifiers in the output part and in the input part of the optical node processor may be also omitted. In this case, the OADM unit is provided with an optical detection function for detecting an LOS alarm and an input level.

As described above, according to the invention, the following effect is produced.

Particularly, in a metropolitan small-scale network, the number of high-priced optical amplifiers can be reduced and the low-priced and efficient APR control can be realized respectively by the optical node processor and the optical network system according to the invention.

Besides, by the optical node processor and the optical network system according to the invention, fixed attenuators different in attenuation are not required to be prepared beforehand as in the prior art, are not required to be inserted in accordance with each transmission line, and an input level to each optical node processor can be easily optimized.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. An optical node processor having automatic power reduction, the optical node processor comprising:
    an optical add/drop multiplexer for adding/dropping an arbitrary wavelength out of wavelength division multiplexing (WDM) optical signals;
    an optical switch which is not an amplifier for collectively shutting down an output of a WDM optical signal from the optical add/drop multiplexer;
    a controller for controlling the optical switch; and
    monitoring control means for controlling the controller according to information from an external device.

2. An optical node processor according to claim 1, further comprising:
    optical couplers provided before and after the optical switch.

3. An optical node processor according to claim 1, wherein:
    the WDM optical signal output is provided to a forward transmission line; and
    the monitoring control means is controlled according to information from a transmission line of an opposite direction.

4. An optical node processor according to claim 3, wherein:
    the information comprises alarm information output when transmission line failure is detected.

5. An optical node processor according to claim 4, wherein;
    the optical switch maximizes attenuation in case it receives the alarm information.

6. An optical node processor according to claim 1, further comprising:
    an optical amplifier on an input side of the optical add/drop multiplexer.

7. An optical node processor according to claim 1, wherein:
    an optical add/drop multiplexing (OADM) unit provided with the optical add/drop multiplexer and the optical switch is provided to a forward transmission line; and
    the monitoring control means is connected to a transmission line having transmissions in an opposite direction.

8. An optical node processor according to claim 7, further Comprising:
    an optical amplifier on an input side of the OADM unit, wherein:
    the monitoring control means is connected to the optical amplifier provided to the transmission line of the opposite direction and the OADM unit is provided to the transmission line of the forward direction.

9. An optical network system using a wavelength division multiplexing (WDM) optical signal and provided with plural optical node processors, the system comprising:
    opposite optical transmission lines, one transmission line for a forward direction in the system and another transmission line for a reverse direction;
    a downstream optical node processor provided with optical detection means for detecting a transmission line failure on a downstream side of one of the opposite transmission lines;
    a transfer means for returning information from the optical detection means to an upstream side; and
    an upstream optical node processor provided with an optical switch which is not an amplifier for collectively attenuating an intensity level of output WDM optical signals according to the information from the transfer means.

10. An optical network system according to claim 9, further comprising:
    transmission means 1 for transmitting information from the optical detection means to the opposite optical transmission lines in the downstream optical node processor; and
    transmission means 2 for returning information from the transfer means to the opposite optical transmission lines in the upstream optical node processor.

11. An optical network system according to claim 10, wherein:
    a monitoring controller is provided to the transmission means 1 and the transmission means 2.

12. An optical network system according to claim 9, wherein the upstream optical node processor further comprises:
    optical couplers provided before and after the optical switch.

13. An optical network system according to claim 9, wherein:
    the information comprises alarm information output when the optical detection means detects transmission line failure.

14. An optical network system according to claim 13, wherein:

the optical switch maximizes attenuation in case it receives the alarm information.

15. An optical network system according to claim 9, further comprising:
an add/drop multiplexer in each optical node processor.

16. An optical network system according to claim 15, further comprising:
an optical amplifier on an input side of the optical add/drop multiplexer.

17. An optical network system according to claim 9, wherein:
the attenuation of the optical switch provided to an upstream optical node processor is adjusted according to the intensity of a WDM optical signal detected by the optical detection means provided to a downstream optical node processor.

* * * * *